S. P. RUGGLES.

Improvement in Map-Type for the Blind.

No. 132,371. Patented Oct. 22, 1872.

Witnesses.
Edmund Masson

Inventor.
Stephen P. Ruggles.
By Atty. A. B. Stoughton.

UNITED STATES PATENT OFFICE.

STEPHEN P. RUGGLES, OF BOSTON, MASSACHUSETTS.

IMPROVEMENT IN MAP-TYPE FOR THE BLIND.

Specification forming part of Letters Patent No. 132,371, dated October 22, 1872.

*To all whom it may concern:*

Be it known that I, STEPHEN P. RUGGLES, of Boston, in the county of Suffolk and State of Massachusetts, have invented certain new and useful Improvements in Map-Type for the Blind; and I do hereby declare the following to be a full, clear, and exact description of the same, reference being had to the accompanying drawing making a part of this specification, in which—

Figure 1:
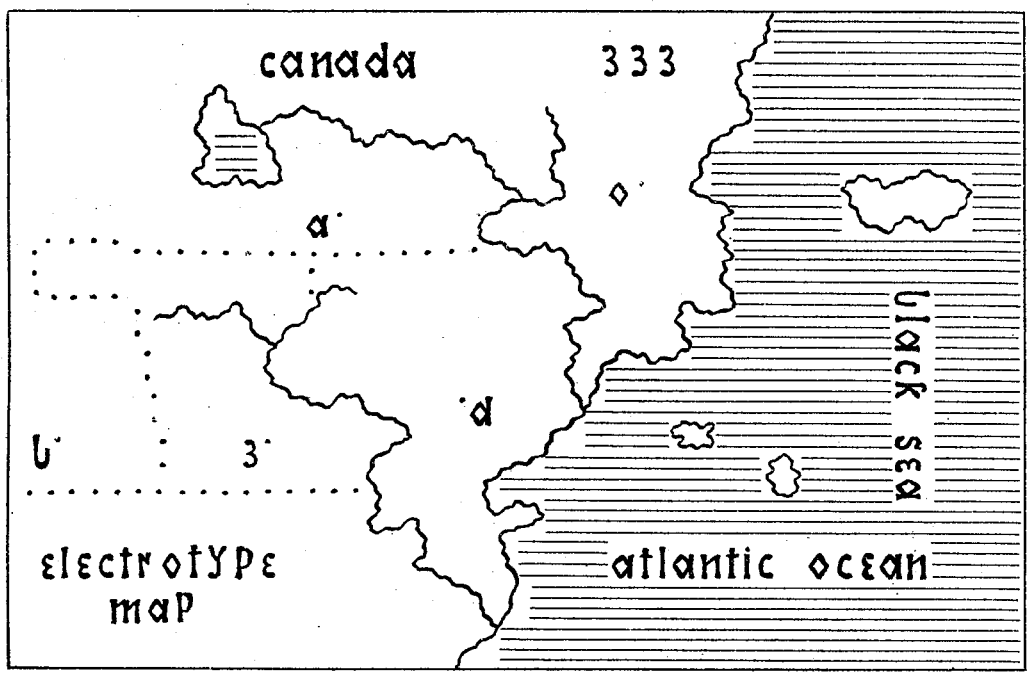
Figure 2:
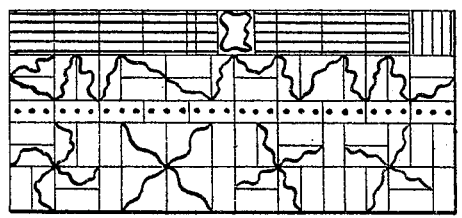

Figure 1 represents a portion of map made up of the type in question, and Fig. 2 represents in a group the type from which the map is mainly composed.

The nature of my invention consists, first, in printing or embossing type having upon their faces different sections of rivers, coast-lines, water-marks, mountains, islands, boundary lines, or such other marks or lines as are found in maps, so as to be able to produce a map of any country and then with the same type produce a map of any other country; and my invention further consists in giving to a series of types, such as above described, different elevations upon their faces, so that the blind by their touch may at once know by the extent of the elevation what particular line or mark of a map it is to represent.

To enable others skilled in the art to make and use my invention, I will proceed to describe the same with reference to the drawing.

The type for forming rivers or coast-lines are made to match at the corners, and by reversing them or turning them one-quarter or one-half round any direction of river or coast-line may be patterned or followed, and by the same type again any other river or coast-line may again be patterned or followed. The lines upon the river or coast-line type are waved or indented and raised, but always terminate so as to match at two corners of the same type, so that placed as they may be, in vertical or horizontal positions, or partly in both positions, the waved and raised lines can always be matched at the corners.

Type to represent water-marks may be made with fine low parallel lines on their faces, so that the blind would know immediately upon putting down their fingers whether what they were touching represented land or water. Other type characters, representing boundary-lines, may have raised dots upon their faces; and others, representing islands, may have a river or coast-line margin with water-marks filled in; or by the river or coast-line margin alone; while lakes may be designated by the water-line fillings. Mountains may be designated by type of different elevations, and the letters for designating the different portions of a map are made of different elevations, so as to make the parts that are the most distinct to the touch more prominent than heretofore done.

The general characteristic of all these type is that they are raised from the face of the block. The river and coast-line type have one characteristic — viz, they match at the corners. The other type named have this general characteristic — viz, that they have different elevations, by which the blind may instantly know by the touch what they represent, the portions most distinct to the touch being most prominent.

Outline maps printed in ink might be made by such type as hereinabove described; but in that case the face of the type would have to be of one elevation and exactly level on top.

Having thus fully described my invention, what I claim therein as new is—

1. Map-type for the blind, the river or coast-line marks or lines of which match at the corners of the type, substantially as and for the purpose described.

2. I also claim map-type for the blind, the water, boundary, island, lake, or mountain indicating lines or dots of which are of different elevations, so that the blind by the touch may correctly and expeditiously know and arrange such type to form outline maps, substantially as described.

STEPHEN P. RUGGLES.

Witnesses:
  F. O. PRINCE,
  C. E. SANBORN.